H. A. CHEESEBRO.
HAY RAKE.
APPLICATION FILED MAR. 26, 1917.

1,281,133.

Patented Oct. 8, 1918.

INVENTOR
Harold A Cheesebro,

WITNESSES

BY
ATTORNEY

UNITED STATES PATENT OFFICE.

HAROLD A. CHEESEBRO, OF IRONDEQUOIT, NEW YORK.

HAY-RAKE.

1,281,133. Specification of Letters Patent. Patented Oct. 8, 1918.

Application filed March 26, 1917. Serial No. 157,494.

*To all whom it may concern:*

Be it known that I, HAROLD A. CHEESEBRO, a citizen of the United States, residing at Irondequoit, in the county of Monroe and State of New York, have invented certain new and useful Improvements in Hay-Rakes, of which the following is a specification.

This invention relates to improvements in hay rakes and more particularly to a side delivery hay rake.

The primary object of the invention is to provide a hay rake that will cause the hay to be gathered at one side of the path over which the rake travels while in operation.

Another object of the invention is to provide means associated with the rake tines to cause the hay to be agitated and moved toward one side of the device, while the same is in operation, whereby the hay will not be permitted to gather in large quantities before the rake tines but will be gradually moved toward the outermost end of the device.

A further object of this invention is the provision of a hay rake which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which.

Figure 1:
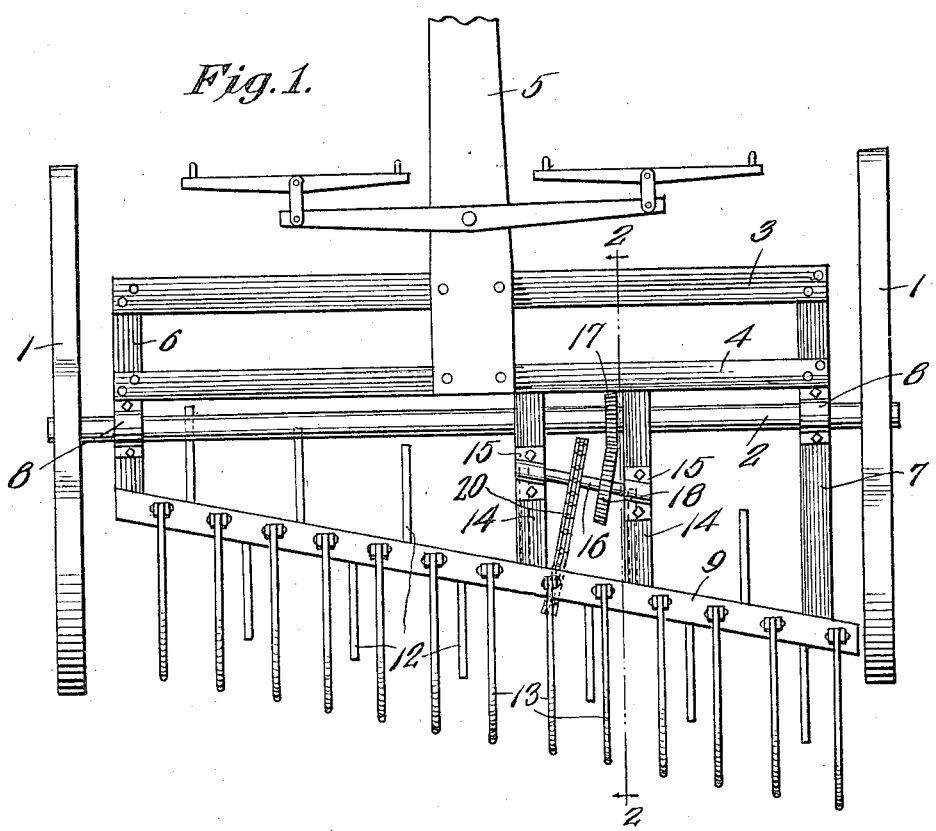
Figure 1 is a top plan view of a hay rake constructed in accordance with my invention.

Referring to the drawing, wherein is illustrated the preferred form of my invention, and in which like numerals of reference indicate corresponding parts throughout the several views, the wheels 1 support the shaft 2 upon which is mounted the frame of the rake. The frame consists of the front bars 3 and 4 to which the draft tongue 5 is fastened. An end bar 6 and another end bar 7 have their forward ends fixed to the ends of the front bars 3 and 4. Bearings 8 are mounted upon the end bars 6 and 7 for receiving the shaft 2 whereby the frame may be mounted in position on the shaft. The shaft 2 is secured to the wheels so that the shaft rotates when the wheels rotate.

Referring to Fig. 1 of the drawing, it will be noted that the bar 6 is considerably shorter than the bar 7 and the rearmost ends of these bars support a tine bar 9, thus causing the tine bar to be disposed at an angle with respect to the longitudinal center line of the shaft 2. Depending from the rear end of each end bar 6 and 7 is a hanger 10, the lower ends of which carry a shaft 11. A plurality of agitating rods 12 are fixed to the shaft 11, and are preferably integrally formed therewith. The shaft 11, of course, will be disposed at the same angle as the tine bar 9 but the agitating rods 12 will extend from the shaft so that they will be parallel to the longitudinal center line of the hay rake when they are disposed in a horizontal plane as shown by Fig. 1 of the drawing.

The tines or rake teeth 13 are pivotally connected to the top of the tine bar 9, and when the teeth are disposed in operative position for gathering hay, the curve of the teeth permits the ends of the rods 12 to swing in close proximity to the teeth when the shaft 11 is rotated.

Figure 2:
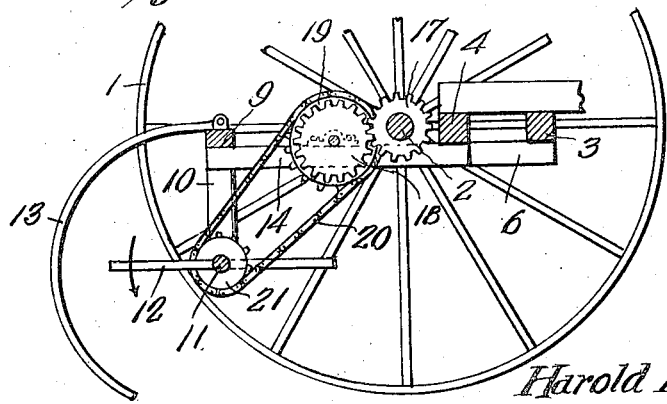
Fig. 2 is a vertical longitudinal section taken on the line 2—2 of Fig. 1.

Extending rearwardly from the bar 4 and connected to the tine bar 9 is a pair of laterally spaced supports 14 carrying bearings 15 for receiving the ends of a countershaft 16 disposed at the same angle as the shaft 11. A bevel gear 17 on the shaft 2 meshes with a bevel gear 18 on the shaft 16, thereby rotating the shaft 16 when the shaft 2 is rotated by the wheels, when the rake is moved forwardly. This causes the shaft 16 to rotate in a direction opposite to that of the shaft 2. A sprocket 19 is mounted on the shaft 16, and receives a sprocket chain 20 which is also passed over a sprocket 21 mounted on the shaft 11 thereby causing the shaft 11 to rotate in the same direction as the shaft 16. When the rake is moved forwardly the agitating rods 12 will be rotated in the direction indicated by the arrow in Fig. 2.

In operation, the rake will be drawn over the ground in the usual manner to gather the cut hay and as the teeth 13 collect the hay the agitating rods 12 will cause the hay to be constantly agitated and thrown forwardly of the tines or teeth 13. By virtue of the angular disposition of the shaft and the position of the agitating rods thereon, the hay will be thrown forwardly and to one side where it will be delivered from the end of the rake. It is to be observed that the teeth 13 are fixed to the tine bar so that they extend rearwardly parallel to the longitudinal center line of the rake and the agitating rods are arranged alternately upon opposite sides of the shaft and are alined with the center of the space between the teeth, this structure being clearly shown in Fig. 1.

From the foregoing it will be observed that a very simple and durable hay rake has been provided, the details of which embody the preferred form. I desire it to be understood however, that slight changes in the minor retails of construction may be made without departing from the spirit of the invention or the scope of the claims hereunto appended.

I claim:

1. In a side delivery hay rake, the combination of a frame, a shaft supporting the frame and having wheels for supporting the shaft and turning the same when the frame is moved, a second shaft supported by the frame and below the latter and disposed diagonally with respect to the said supporting shaft, a counter shaft supported by the frame and parallel with the said second shaft, intermeshing gears carried by the supporting shaft and the counter shaft for rotating the latter when the shaft is rotated, means connecting the said counter shaft with the said second shaft for imparting rotary movement to the second shaft in the direction opposite to the direction of rotation of the supporting shaft, a time bar carried by the frame and disposed directly above the said second shaft and parallel with the latter and having a plurality of tines projecting rearwardly and at right angles to the said supporting shaft, and a plurality of agitating elements carried by the second shaft and projecting from the second shaft at an obtuse angle thereto.

2. In a side delivery hay rake, the combination of a frame, a shaft supporting the frame and having wheels for supporting the shaft and turning the same when the frame is moved, a second shaft supported by the frame and below the latter and disposed diagonally with respect to the said supporting shaft, a counter shaft supported by the frame and parallel with the said second shaft, intermeshing gears carried by the supporting shaft and the counter shaft for rotating the latter when the supporting shaft is rotated, means connecting the said counter shaft with the said second shaft for imparting rotary movement to the second shaft in the direction opposite to the direction of rotation of the supporting shaft, a tine bar carried by the frame and disposed directly above the said second shaft and parallel with the latter and having a plurality of tines projecting rearwardly and at right angles to the said supporting shaft, and a plurality of agitating elements carried by the second shaft and projecting from the second shaft at an obtuse angle thereto, each alternate agitating element being projected in the opposite direction from the intervening agitating element.

3. A side delivery hay rake comprising a frame mounted upon wheels and having a rearwardly disposed tine bar provided with a plurality of rearwardly projecting tines, a shaft disposed directly beneath the said tine bar, the said bar and the shaft being disposed diagonally with respect to the frame and in parallel relation, means for rotating the said shaft, and a plurality of agitating elements projecting from the said shaft at an obtuse angle thereto and at the same angle as the said tines when the agitating elements are in a horizontal plane.

In testimony whereof I affix my signature in presence of two witnesses.

HAROLD A. CHEESEBRO.

Witnesses:
 JOSEPH C. WITZEL,
 S. G. LITUS.

Copies of this patent may be obtained for five cents each, by addressing the "Commissioner of Patents, Washington, D. C."